United States Patent [19]

Ikebata

[11] 4,140,948
[45] Feb. 20, 1979

[54] CONVERGENCE APPARATUS
[75] Inventor: Shigeki Ikebata, Amagasaki, Japan
[73] Assignee: Mitsubishi Denki Kabushiki Kaisha, Tokyo, Japan
[21] Appl. No.: 799,996
[22] Filed: May 24, 1977
[30] Foreign Application Priority Data
  Jun. 1, 1976 [JP] Japan .................................. 51-64873
[51] Int. Cl.² .......................... H01J 29/70; H01J 29/76
[52] U.S. Cl. .................................... 315/368; 315/13 C
[58] Field of Search ...................... 315/368, 13 C, 371
[56] References Cited
  U.S. PATENT DOCUMENTS
  3,735,191 5/1973 Peter .................................... 315/13 C
  3,935,506 1/1976 Brockmann ........................ 315/13 C FOREIGN PATENT DOCUMENTS
  2012252 9/1971 Fed. Rep. of Germany ........... 315/368

Primary Examiner—Theodore M. Blum
Attorney, Agent, or Firm—Oblon, Fisher, Spivak, McClelland & Maier

[57] ABSTRACT

A convergence apparatus in a color CRT display scanning the display surface by a plurality of electron beams, comprising convergence coils for pole pieces which impart electromagnetic action to the electron beams and a transistor circuit for superposing both of the horizontal and vertical convergence correction currents to each of the convergence coils whereby the precise convergence correction is attained.

1 Claim, 5 Drawing Figures

CONVERGENCE APPARATUS

BACKGROUND OF THE INVENTION

The present invention relates to a convergence apparatus in a color CRT display.

Heretofore, in a color CRT display for selecting displaying colors by a plurality of electron beams, it has been proposed to attain the horizontal and vertical convergence corrections of the electron beams by using an apparatus comprising horizontal convergence coils for generating a horizontal convergence correction magnetic field and vertical convergence coils for generating a vertical convergence correction magnetic field and to feed horizontal and vertical convergence correction currents to the two coils for each of the pole pieces which impart electromagnetic action to the electron beams, respectively.

FIG. 1 shows the structure of one pole piece in the conventional convergence apparatus.

FIG. 2 shows current waveforms for illustrating the conventional convergence apparatus.

In FIG. 1, the reference numeral 1 designates a pole piece; 2 designates a vertical convergence coil; 3 designates a horizontal convergence coil. In the apparatus, the sawtooth waveform voltages $V_1$, $V_2$ which are respectively proportional to the vertical and horizontal deflecting currents of the vertical and horizontal convergence coils 2, 3 are applied to pass parabolic waveform currents $I_1$, $I_2$ shown in FIG. 2 which are formed by the integrating action of the convergence coils, thereby providing a suitable convergence correction magnetic field.

However, in the conventional apparatus, both of the vertical and horizontal convergence coils 2, 3 connected to each pole piece are disposed in close electromagnetic coupling. Accordingly, when the current waveform in one convergence coil is varied, the variation affects that of the other convergence coil whereby the convergence alignment is not easily attained.

SUMMARY OF THE INVENTION

It is an object of the present invention to overcome the disadvantages of the conventional apparatus and to provide the simple structure of the convergence apparatus.

The foregoing and other objects of the present invention have been attained by connecting one convergence coil for each pole piece and simultaneously superposing and feeding both of the vertical and horizontal convergence correction currents to the convergence coil.

In the convergence apparatus of the present invention, only one coil is connected for each pole piece instead of two coils so as to simplify the structure of the coil. Both of the horizontal and vertical convergence correction currents are simultaneously superposed to feed them to one coil whereby the needless electrical coupling between two coils which has been caused in the conventional apparatus is eliminated to easily produce the precise convergence correction magnetic field.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
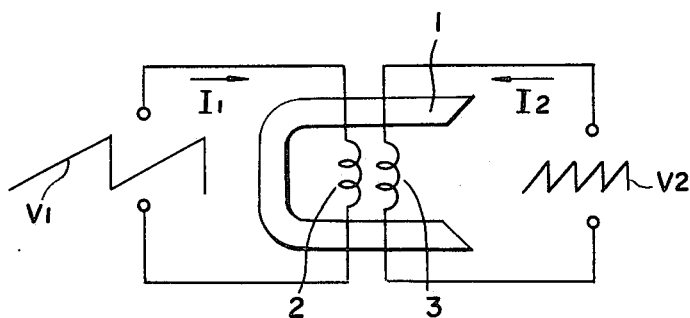
FIG. 1 shows a structure around one pole piece of the conventional convergence apparatus.
Figure 2:
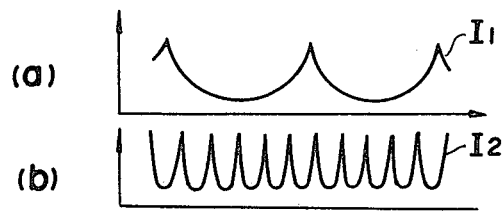
FIGS. 2(a), (b) show current waveforms for illustrating the conventional apparatus.
Figure 3:
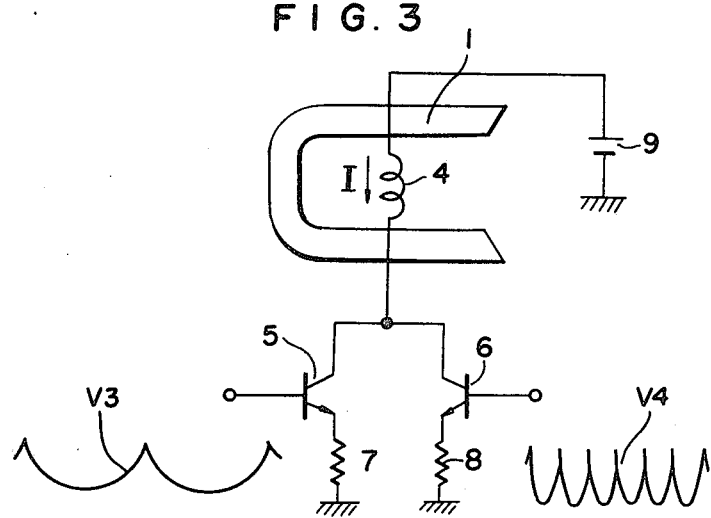
FIG. 3 shows a structure around one pole piece of one embodiment of the convergence apparatus of the present invention.

FIG. 3 shows the structure around one pole piece of the conversion apparatus of the present invention.

Figure 4:
FIG. 4 shows current waveform for illustrating the embodiment.

FIG. 4 shows the current waveform for illustrating the operation of the convergence apparatus.

In FIG. 3, the reference numeral 4 designates one convergence coil;

5, 6 designate transistors;

7, 8 designate resistors; and 9 designates a DC power source.

When the vertical parabolic waveform voltage $V_3$ given by integrating the vertical deflecting current, is applied to the base of the transistor 5 and the horizontal voltage $V_4$ given by integrating the horizontal deflecting current, is applied to the base of the transistor 6, the collector current of the transistor 5 is proportional to the vertical parabolic waveform voltage $V_3$ and the collector current of the transistor 6 is proportional to the horizontal parabolic waveform voltage $V_4$. Accordingly, the collector currents of both of the transistors are superposed in the convergence coil 4 connected to the collectors of both of the transistors whereby the current shown in FIG. 4 I is passed. That is, the magnetic field generated by the pole piece 1 is proportional to the current waveform in FIG. 4, to attain a suitable convergence correction.

In the operation of the apparatus, the transistors 5, 6 are operated as the current generators. There is no interference between the collector currents whereby the needless coupling of the vertical and horizontal convergences caused in the conventional apparatus can be eliminated.

Figure 5:
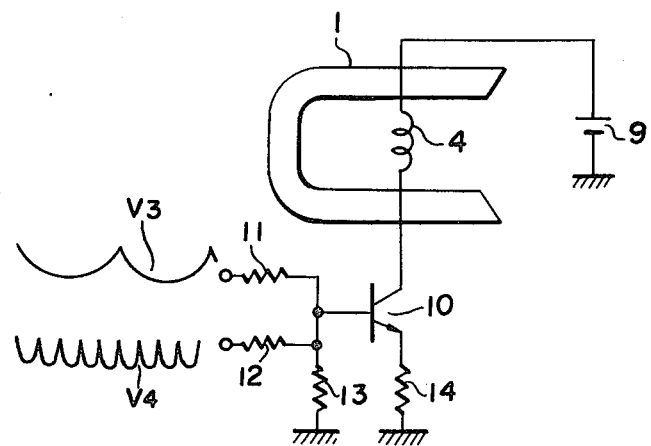
FIG. 5 shows a structure around one pole piece of another embodiment of the convergence apparatus of the present invention.

FIG. 5 shows another embodiment of the convergence apparatus of the present invention wherein the reference numeral 10 designates a transistor;

(11), (12), (13) and (14) respectively designate resistors.

In this embodiment, only one transistor 10 is connected to the convergence coil 4 and the vertical parabolic voltage $V_3$ and the horizontal parabolic voltage $V_4$ are superposed as one voltage level by the summing circuit comprising the resistors 11, 12 and 13 and then, they are applied to the base of the transistor 10. The operation is substantially the same with that of FIG. 3.

In accordance with the convergence apparatus of the present invention, each convergence coil is connected to each pole piece for imparting electromagnetic action to each of a plurality of electron beams which selectively scan the displaying colors and the horizontal convergence correction current and the vertical convergence correction current are superposed and fed to the convergence coil whereby the needless interference between both of horizontal and vertical convergence found in the conventional apparatus can be eliminated to attain the precise convergence correction and the structure of the convergence apparatus can be simplified. Accordingly, the convergence apparatus of the present invention is practically advantageous to prepare the color CRT having high accuracy.

Obviously, numerous additional modifications and variations of the present invention are possible in light of the above teachings. It is therefore to be understood that within the scope of the appended claims, the invention may be practiced otherwise than as specifically described herein.

What is claimed:

1. In a color cathode ray tube display wherein a display surface is scanned by a plurality of electron beams, a convergence apparatus comprising:
   a pole piece for imparting electromagnetic action to an electron beam;
   a convergence coil associated with the pole piece;
   a pair of transistors, each transistor having first and second main current electrodes and a control electrode;
   means for connecting each of the first main current electrodes of the transistors in common to one end of the convergence coil;
   means for connecting each of the second main current electrodes of the transistors in common to one pole of a DC power source;
   means for connecting the other end of the convergence coil to the other pole of the DC power source;
   means for connecting the control electrode of one of the pair of transistors to a first parabolic waveform voltage source to produce a horizontal frequency convergence correction current at the first main current electrode of the one of the pair of transistors; and
   means for connecting the control electrode of the other of the pair of transistors to a second parabolic waveform voltage source to produce a vertical frequency convergence correction current at the first main current electrode of the other of the pair of transistors;
   whereby the horizontal and vertical convergence correction currents at the first main current electrodes of the pair of transistors are superposed in the convergence coil so that a precise convergence correction magnetic field is produced.

* * * * *